United States Patent
Omae et al.

(10) Patent No.: US 7,647,036 B2
(45) Date of Patent: Jan. 12, 2010

(54) SECURITY GROUP MANAGEMENT SYSTEM

(75) Inventors: Koji Omae, Yokohama (JP); Yoichi Matsumoto, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 528 days.

(21) Appl. No.: 11/324,268

(22) Filed: Jan. 4, 2006

(65) Prior Publication Data

US 2006/0174121 A1    Aug. 3, 2006

(30) Foreign Application Priority Data

Jan. 11, 2005    (JP)    ............................. 2005-004408

(51) Int. Cl.
*H04M 1/66*    (2006.01)
*H04M 1/68*    (2006.01)

(52) U.S. Cl. ........................ 455/411; 455/416; 455/519; 455/435.1

(58) Field of Classification Search ................ 455/415, 455/416, 410, 411, 412.1, 517, 435.1, 435.3, 455/518, 519, 520, 434, 515; 713/172, 181, 713/176
See application file for complete search history.

(56) References Cited

U.S. PATENT DOCUMENTS

| 5,634,197 | A | 5/1997 | Paavonen | |
|---|---|---|---|---|
| 2001/0051915 | A1* | 12/2001 | Ueno et al. | ................... 705/39 |
| 2004/0073814 | A1* | 4/2004 | Miyazaki et al. | ............ 713/202 |
| 2004/0260709 | A1* | 12/2004 | Matsuno et al. | ............. 707/100 |
| 2004/0264697 | A1 | 12/2004 | Gavrilescu et al. | |

FOREIGN PATENT DOCUMENTS

| EP | 1 102 430 A1 | 5/2001 |
|---|---|---|
| EP | 1 395 019 A2 | 3/2004 |
| EP | 1 494 429 A2 | 1/2005 |
| WO | WO 02/063847 A2 | 8/2002 |

OTHER PUBLICATIONS

Yoichi Matsumoto, "Mobile Ubiquitous Communication Platform Based on Harmonized Cellular and Mesh Networks", CCNC 2005 panel discussion, Jan. 4, 2005, 5 pages.

Yoichi Matsumoto, "Mesh Network Based Platform for Universal Mobile Communication Services", NTT DoCoMo Wireless Labs, 2004 Spring Workshop sponsored by Intel, Apr. 1, 2004, 13 pages.

* cited by examiner

*Primary Examiner*—John Lee
(74) *Attorney, Agent, or Firm*—Oblon, Spivak, McClelland, Maier & Neustadt, L.L.P.

(57) ABSTRACT

A security group management system includes a cellular mobile station (2), two or more devices (3) belonging to a group, and a group management server (1). The group management server comprises a storage unit (11, 13) configured to store information about the cellular mobile station registered by a member of the group and group information about the group in advance; and a group information providing unit (16) configured to supply the group information in response only to an access from the registered cellular mobile station. The cellular mobile station has a group information transmission unit (23) configured to supply the group information to the devices so as to allow the devices to recognize that the devices belong to the group and to perform secure mutual connection and/or resource sharing among the devices.

21 Claims, 14 Drawing Sheets

US 7,647,036 B2

SECURITY GROUP MANAGEMENT SYSTEM

FIELD OF THE INVENTION

The present invention relates to a security group management system that realizes mutual secure connection and resource sharing among devices belonging to a prescribed group.

BACKGROUND OF THE INVENTION

Conventionally, an access control list (ACL) is used to allow only those devices (such as personal computers) used by specific members belonging to a certain group to access the network resources and prevent unauthorized accesses from third parties. Using the access control list, connection requests from users or devices not listed on the access control list are rejected to prevent unauthorized accesses.

In a wireless LAN, access control called MAC (media access control) address filtering is performed using an access control list. Multiple access points (APs) share the access control list to exclude unauthorized accesses from devices with MAC addresses not listed in the access control lists.

However, there are problems arising in simply using an access control list to prevent unauthorized accesses from third parties.

With the conventional access control technique using an access control list, each of the access points checks accesses using the access control list at each location as long as such accesses are made through this accessing route. However, this technique cannot be applied to an ad-hoc environment in which direct connection and/or resource sharing is carried out among multiple devices. For example, members of a particular group may connect their devices directly with each other to mutually exchange information, or a mesh network may be structured using home digital devices to share resources through mutual connections. In such a situation, a device being accessed cannot specify in advance the counterpart device currently accessing the former device, and therefore, it is difficult to prevent spoofing by a malicious third party. This involves the risk of leak of confidential information intended to be opened only to the group member.

In addition, when an access check mechanism using an ACL is provided to an accessing route, an administrator has to update the access control list every time a new user or a new device is added. Workload increases, while prompt response cannot be expected. This problem becomes conspicuous especially when forming a mesh network. One of the advantages of a mesh network is broadening of coverage by participation of multiple devices. In order to take advantage of this feature, multiple participants have to be allowed to freely connect their devices to the mesh network. It is difficult for the conventional technique to realize this, while maintaining network security.

SUMMARY OF THE INVENTION

The present invention was conceived in view of the problems in the conventional techniques, and it is an object of the present invention to provide a security group management system that achieves mutual secure connection and/or resource sharing among multiple devices belonging to a group.

Accordingly to one aspect of the invention, a security group management system including a cellular mobile station, two or more devices belonging to a group, and a group management server is provided. In this system, the group management server comprises a storage unit configured to store information about the cellular mobile station registered by a member of the group and group information about the group in advance, and a group information providing unit configured to supply the group information in response only to an access from the registered cellular mobile station. The cellular mobile station has a group information transmission unit configured to supply the group information to the devices so as to allow the devices to recognize that the devices belong to the group and to perform secure mutual connection and/or resource sharing among the devices.

With this arrangement, group information is supplied to the devices only via the specific cellular mobile station registered in advance. Based on consistency between the group member and the cellular mobile station, spoofing by unauthorized third parties can be prevented, and secure mutual connection and/or resource sharing among the devices belonging to a specific group can be achieved. Since group information is supplied to the devices via the cellular mobile station, a simple device without a dedicated receiver can receive the group information.

For example, the group information is an electronic certificate containing a first public key allocated to the group and signed by a first private key paired with the first public key. Accordingly, secure mutual connection and/or resource sharing are realized using the electronic certificate.

In another example, the group information is a device key pair consisting of a private key and a second public key for each of the devices. Accordingly, secure mutual connection and/or resource sharing are realized using the device key pair.

In still another example, the group information is a symmetric key allocated to the group. Accordingly, secure mutual connection and/or resource sharing are realized using the symmetric key.

In an embodiment, communication between the cellular mobile station and the group management server is started after SSL client authentication is successful. With this arrangement, a security level as high as a cellular network can be guaranteed even if the group management server is placed on the Internet. Consequently, the group information can be delivered securely.

In an embodiment, communications between the cellular mobile station and the devices are performed by short-range wireless interfaces. With this arrangement, the group information is supplied from the cellular mobile station to the devices quickly. In addition, because the range of providing the group information is limited, tempest intercept or sniffing can be prevented.

In an embodiment, at least one of the devices has a hardware button for limiting receipt of the group information to a prescribed period of time after the hardware button is depressed. This arrangement can prevent unintended supply of the group information due to error manipulation of the cellular mobile station.

In an embodiment, the group management server has a first storage unit configured to store group identification in association with the group information, a second storage unit configured to store an individual identification representing an individual belonging to the group and using the cellular mobile station in association with the group ID, and a third storage unit configured to store a cellular mobile station identification representing the cellular mobile station in association with the individual identification.

In an embodiment, the cellular mobile station identification is registered and updated in the third storage unit in response to a request from the cellular mobile station. This arrangement can simplify the managing process of the group management server without reducing the security because the group management can be performed on an individual basis, without managing the cellular mobile station.

In an embodiment, a two-dimensional code containing an individual ID representing a user of the cellular mobile station and a network address of the group management server is produced, and the cellular mobile station reads the two-dimensional code distributed to the user to access the group management server. This arrangement can prevent input errors and simplify the cellular mobile station ID setting operation.

In an embodiment, the storage unit further stores device identification for specifying each of the devices and an attribute of the associated one of the devices, in association with the cellular mobile station ID. With this arrangement, the group information can include device information.

In this case, the device ID is acquired, for example, by the cellular mobile station from the device, and supplied from the cellular mobile station to the group management server.

The device ID may be produced by the user of the cellular mobile station, and it may be given to the device. The device ID is also registered and updated in the storage unit of the group management server. With this arrangement, the user can use a unique device ID system.

In an embodiment, the storage unit stores a typical application of each of the devices as the attribute, in association with a traffic priority level for the device. Because a reasonable priority level is set according to the major function of the device, a desired QoS can be maintained in a stable manner.

In an embodiment, the storage unit can temporarily change the traffic priority level in response to a request from the cellular mobile station, and the group information providing unit informs the devices of the change via the cellular mobile station. With this arrangement, a desired communication environment can be produced in accordance with a user's request.

In an embodiment, at least one of the devices has two or more wireless interfaces, and the wireless interfaces are grouped into an ordinary traffic group and a preferential traffic group so as to prevent frequencies from overlapping each other. Consequently, interference can be prevented, and the desired QoS can be guaranteed for the preferential traffic in a stable manner.

In an embodiment, upon receiving a request for content delivery from the cellular mobile station, the group management server selects a most appropriate device to deliver the content from the storage unit and delivers the content to the selected device. This arrangement can improve the user-friendliness of the system because it is unnecessary for the user to designate each device in the group when requesting the content.

In an embodiment, the group management server further comprises a service charge calculation unit configured to calculate a service charged based upon at least one of a storage area utilization size, service utilization time, access counts, accessing time, and an acquired information size.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
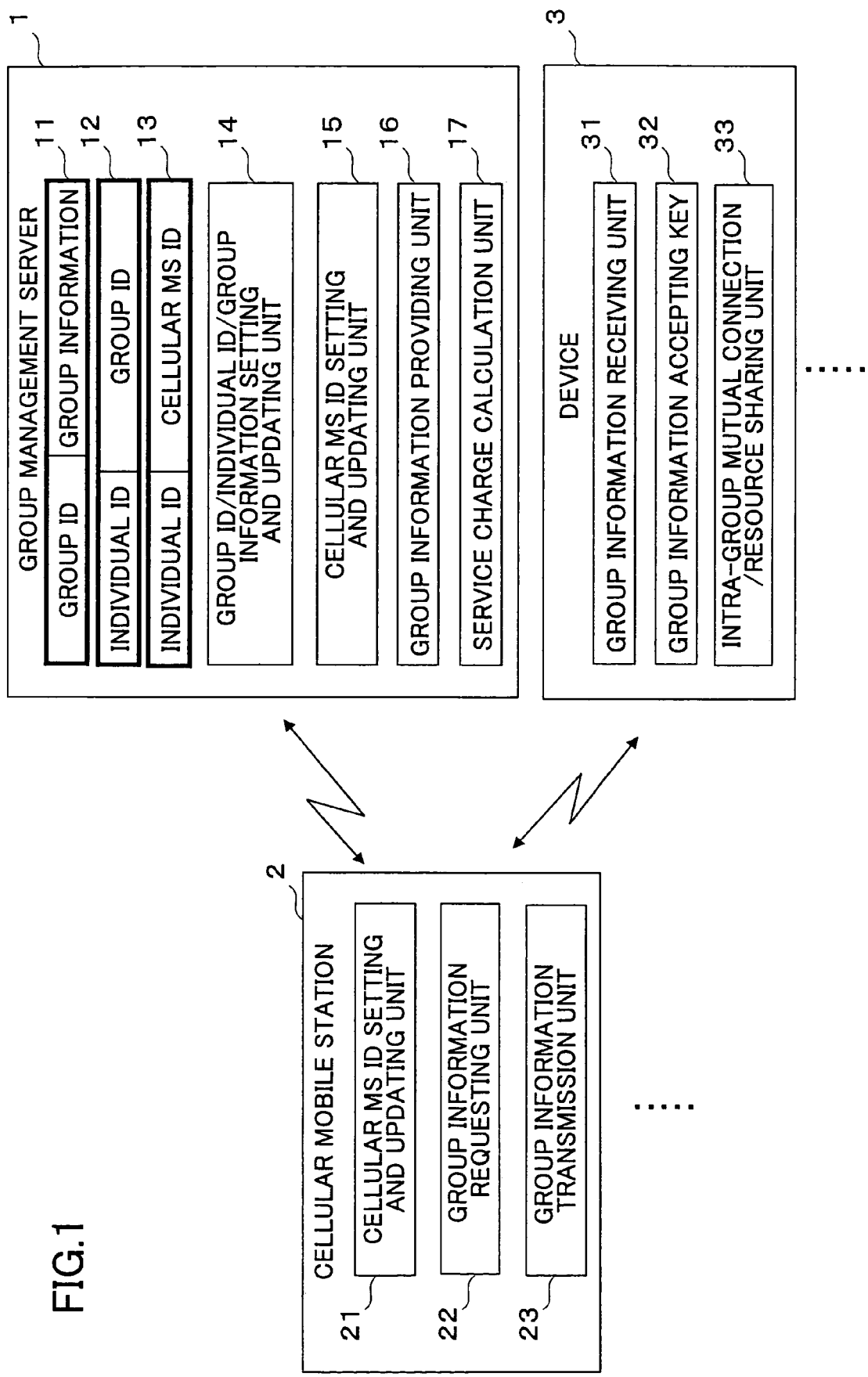
FIG. 1 is a schematic block diagram illustrating a security group management system according to the first embodiment of the invention.

FIG. 1 is a schematic block diagram illustrating a security group management system according to the first embodiment of the invention. The security group management system includes a group management server 1 for managing group information, a cellular mobile station (MS) 2 used by a member belonging to the group, and a device 3 commonly used in the group and/or mutually connected to other group devices.

The group management server 1 has a first storage unit 11 for storing a group ID for identifying a group in association with the group information unique to that group, a second storage unit 12 for storing an individual ID representing a person belonging to the group in association with the group ID, and a third storage unit 13 for storing an individual ID in association with a cellular mobile station (MS) ID for identifying the cellular mobile station used by that person. In the group management server 11, a group ID/individual ID/group information setting and updating unit 14 enters and updates group IDs, individual IDs, and group information in the first through third stage units 11, 12 and 13 in response to a command from an administrator. A cellular MS ID setting and updating unit 15 enters and updates cellular MS ID information in the third storage unit 13 in response to a request from the cellular mobile station 2. A group information providing unit 16 provides group information in response to a request from the cellular mobile station 2 registered in the third storage unit 13. A service charge calculation unit 17 calculates a service charge based on at least one of the storage area utilization size, service utilization time, the access counts, accessing time, and the acquired information amount.

The cellular mobile station 2 has a cellular MS ID setting and updating unit 21 for requesting the group management server 1 to enter and update the cellular mobile station ID, a group information acquiring unit 22 for requesting the group management server 1 to provide the group information, and a group information transmission unit 23 for transmitting (or supplying) the group information acquired from the group management server 1 to the device 3.

The device 3 has a group information receiving unit 31 for receiving the group information from the cellular mobile station 2, a group information accepting key 32 structured as a hardware button for limiting the receipt of the group information to a prescribed period of time after the button is depressed in order to prevent unintended supply of the group information due to error manipulation of the cellular mobile station 2, and an intra-group mutual connection and resource sharing unit 33 for establishing secure mutual connection among devices belonging to the group or sharing the group resources by determining whether other devices belong to the group based on the group information supplied from a cellular mobile station.

Next, explanation is made of examples of information exchange between students (members) belonging to a certain class or a college seminar through chatting by connecting the personal computers (devices) with each other, in conjunction with FIG. 2 through FIG. 6.

Figure 2:
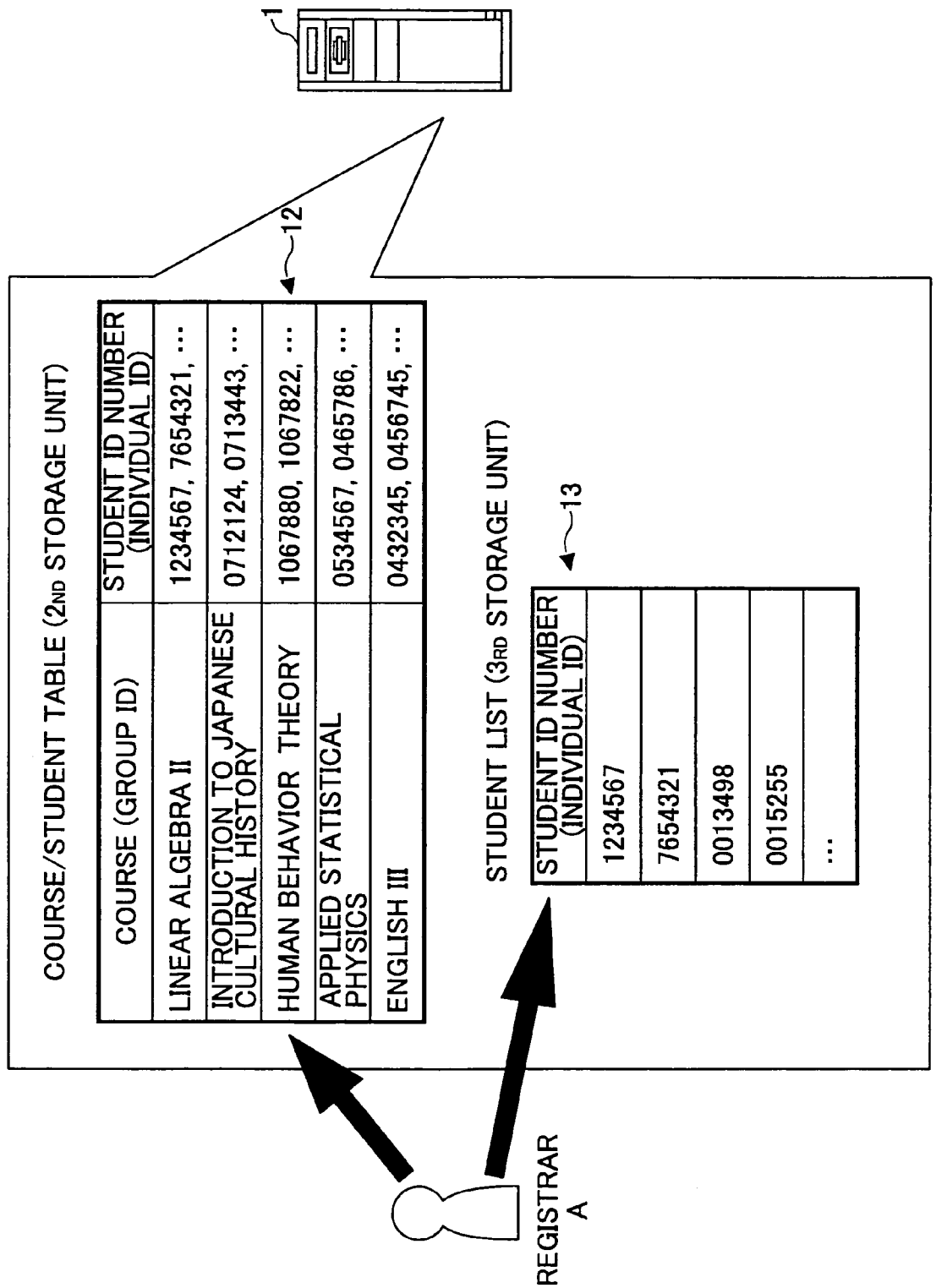
FIG. 2 illustrates an example of storing individual ID information in association with a group ID.

FIG. 2 is a schematic diagram illustrating an example of setting a group ID and an individual ID. Registrar A at the Registrar's Office of a college creates a student ID list in the third storage unit 13 in the group management server 1, as well as a course/student table listing students IDs in association with each course in the second storage unit 12 based on the course registrations.

Figure 3:
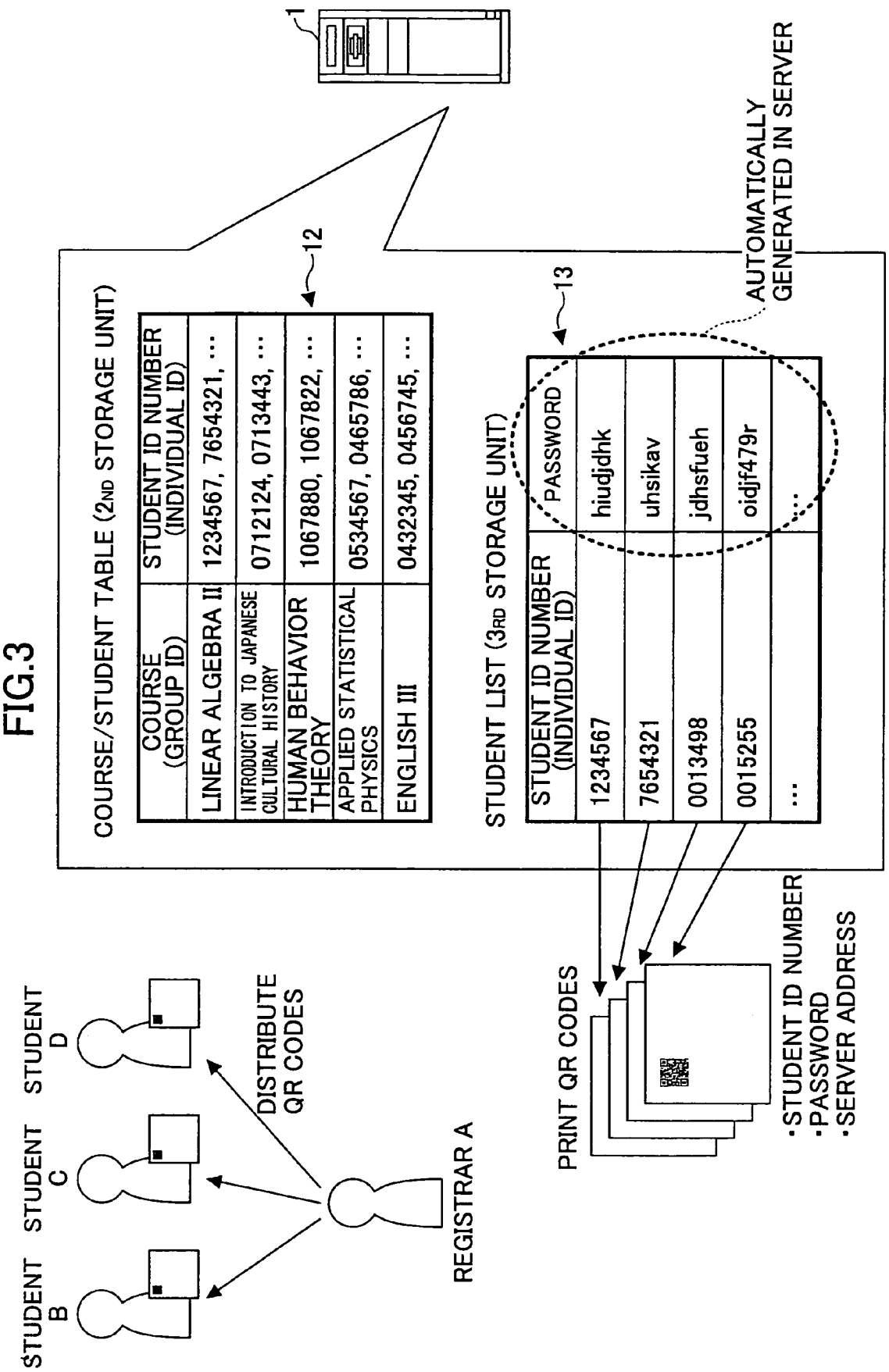
FIG. 3 illustrates an example of distribution of server-accessing QR codes.

Then, as illustrated in FIG. 3, the group management server 1 automatically generates a password for each of the students recorded in the third storage unit 13, and creates a two-dimensional code (such as a QR code) containing a student ID number, the associated password, and the network address of the group management server. Registrar A prints out the QR codes and hands or sends the printed QR codes to students B, C, D, . . . .

Figure 4:
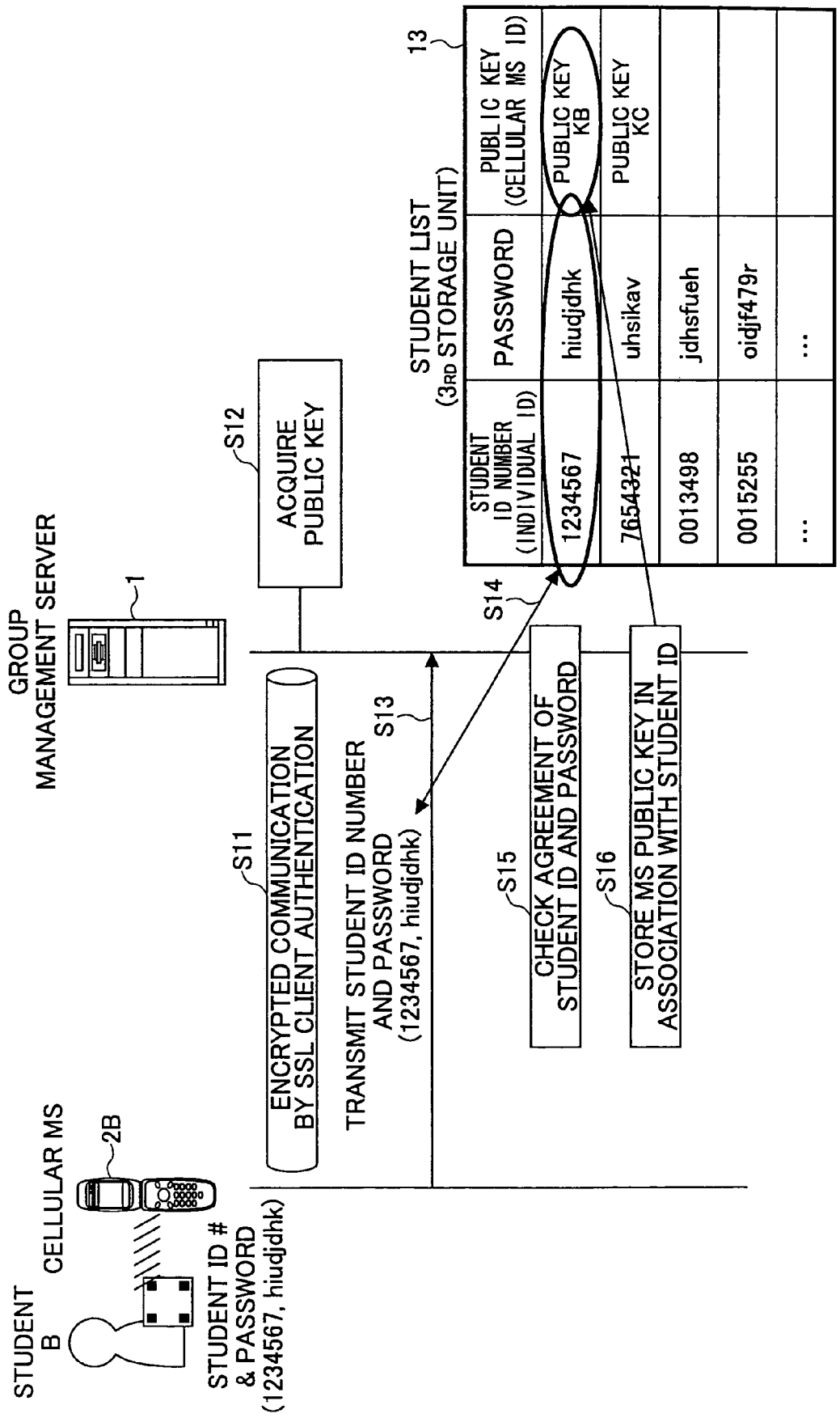
FIG. 4 is a sequence diagram of registering a cellular mobile station ID in the group management server.

FIG. 4 is a sequence diagram of registration of a cellular mobile station ID in the group management server 1. Having received the QR code, student B reads the QR code into the cellular mobile station 2B using the QR code reader furnished with the cellular mobile station 2B, and connects the cellular mobile station 2B to the group management server 1 using the server address contained in the QR code via encrypted communications under SSL client authentication (step S11). Through the encrypted communication, the group management server 1 acquires the public key of the cellular mobile station 2B (step S12).

The cellular mobile station 2B further transmits the student ID number and the password contained in the QR code to the group management server 1 (step S13). The group management server 1 checks to confirm agreement of the combination of the student ID number and the password with the registered information in the third storage unit 13 (steps S14 and S15). If the agreement has been confirmed, the group management server 1 stores the public key $K_B$ of the cellular mobile station 2B in association with the student ID number and the password in the third storage unit 13 (step S16). Student C also registers the public key $K_C$ of his or her cellular mobile station 2C in the group management server 1 with a similar process.

Figure 5:
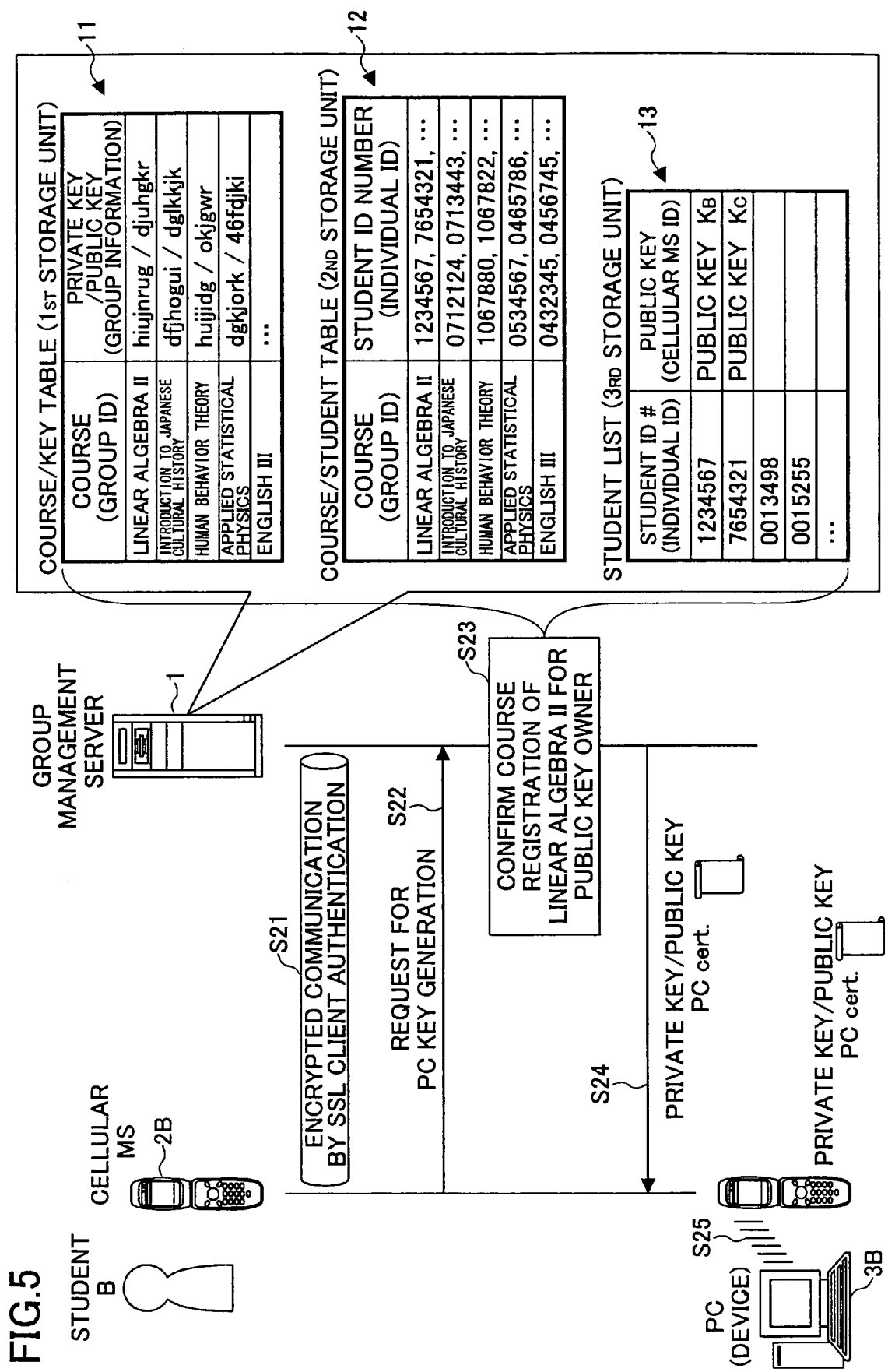
FIG. 5 is a sequence diagram of acquiring group information from the group management server.

When students B and C taking the same course (Linear Algebra II, for example) are to exchange information about presentations or a paper through text chatting, as illustrated in FIG. 5, student B accesses the group management server 1 using the cellular mobile station 2B via encrypted communications under SSL client authentication (step S21) to request the group management server 1 to create a private key for his or her personal computer (step S22).

The group management server 1 specifies the student ID number "1234567" by querying the third storage unit 13 based on the public key $K_B$ of the cellular mobile station 2B received during the encrypted communication based on SSL client authentication, and confirms that student B is registered in Linear Algebra II by querying the second storage unit 12 based on the student ID number (step S23). A pair of private key and public key is allocated to each course and stored in the first storage unit 11 in advance. The group management server 1 acquires the private key/public key pair for Linear Algebra II from the first storage unit 11, and creates a private key/public key pair for the personal computer of student B. The group management server 1 also creates an electronic certificate containing the course public key signed by the paired private key, and transmits the certificate and private/public keys to the cellular mobile station 2B (step S24).

Upon receiving the private key/public key pair for the personal computer and the electronic certificate for the personal computer from the group management server 1, the cellular mobile station 2B transmits the private key/public key pair and the electronic certificate to the personal computer via short-range wireless communication (step S25). Once the personal computer has received the certificate from the cellular mobile station 2B, the personal computer relies on this electronic certificate thereafter. It means that the personal computer 3B regards the private key allocated to Linear Algebra II as a certificate authority. Similarly, student C acquires a private key/public key pair and an electronic certificate for his or her personal computer 3C from the group management server 1, and loads the information in his or her personal computer 3C using his or her cellular mobile station 2C via short-range wireless communications. Afterward, the personal computer of student C relies on the electronic certificate.

Figure 6:
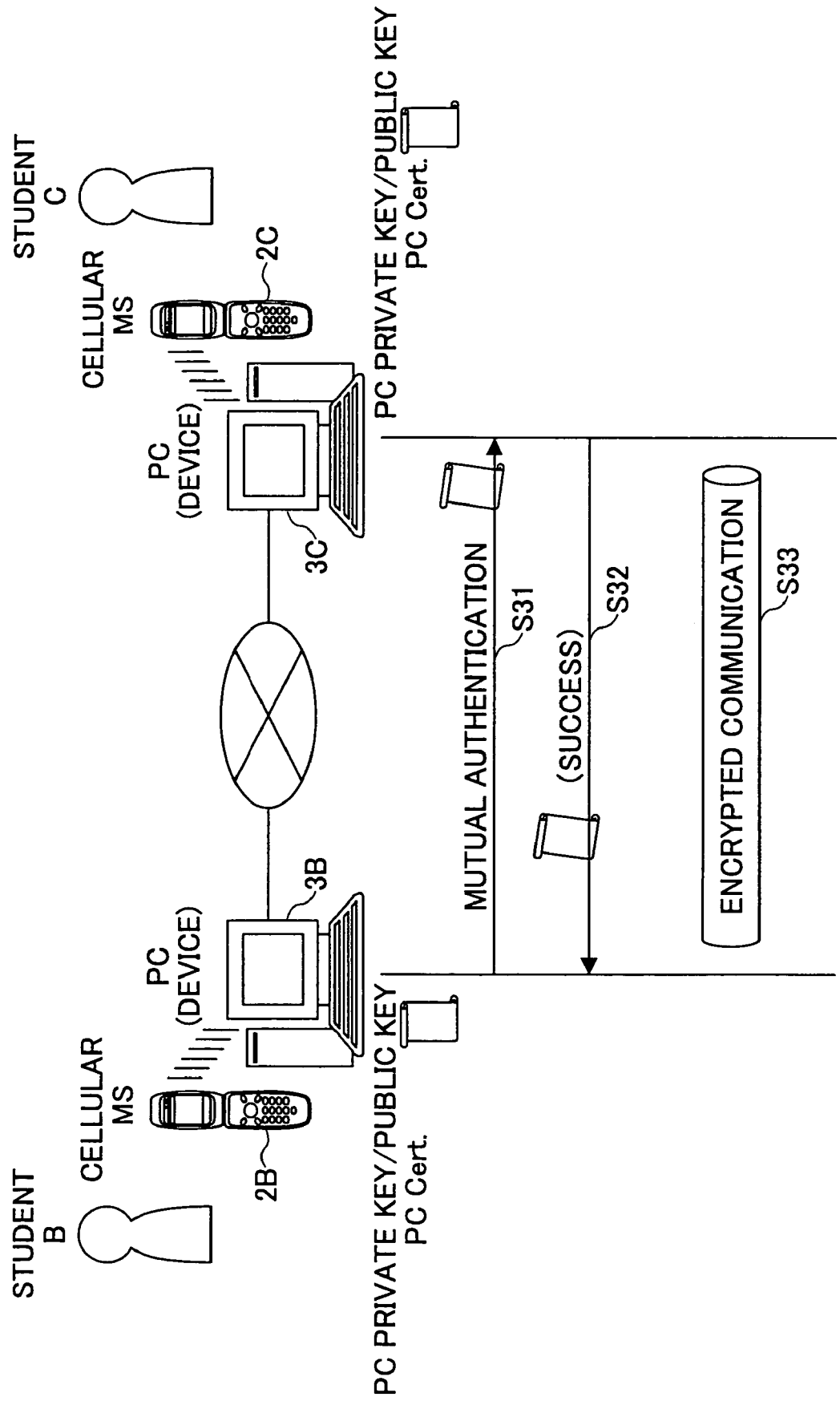
FIG. 6 is a sequence diagram of chatting between personal computers based on the group information acquired from the group management server.

In FIG. 6, students B and C connect their personal computers 3B and 3C to each other via a network, and perform public key system mutual authentication (step S31). Because the personal computers 3B and 3C are already relying on the electronic certificates acquired from the group management server 1, the authentication is successfully performed (step S32). Then, highly confidential and secure encrypted communications are performed by exchanging the session keys for the chatting (step S33).

Figure 7:
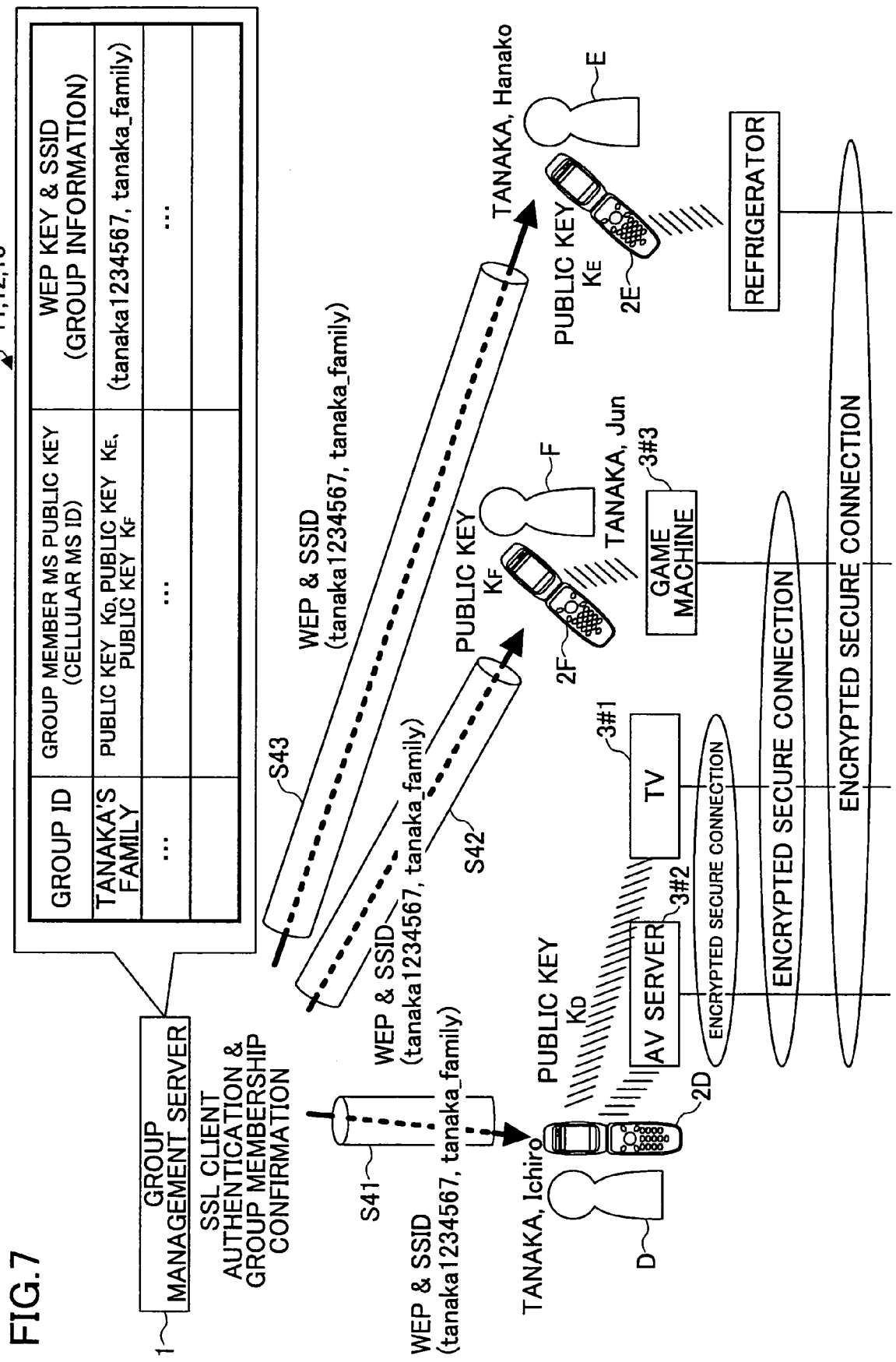
FIG. 7 illustrates an example of establishing a home mesh network.

FIG. 7 illustrates an example of a home mesh network structured by devices (or home appliances). A home owner D named "Ichiro Tanaka" applies for group registration in written form, for example, to the operator of the group management server 1. The items to be registered are:

1) a public key of cellular mobile station 2D of Ichiro Tanaka (D);

2) a public key of cellular mobile station 2E of Hanako Tanaka (E), a member of the family; and 3) a public key of cellular mobile station 2D of Jun Tanaka (F), a member of the family.

These information items are stored in the first storage unit 11 in the group management server 1.

The operator of the group management server 1 creates and registers a wired equivalent privacy (WEP) key, which is a symmetric key used in the group, and a service set identifier (SSID) for the group in the first storage unit 11. Afterward, the group management server 1 transmits this group information (the WEP key and the SSID) in response only to the accesses from the cellular mobile stations 2D, 2E, and 2F owned by Ichiro Tanaka (D), Hanako Tanaka (E) and Jun Tanaka (F), respectively.

Then Ichiro Tanaka (D) purchases a television set 3#1 and an AV server 3#2 with a built-in capability for functioning as a mesh access point, and places these devices in the living room. Ichiro Tanaka (D) accesses the group management server 1 using the cellular mobile station 2D by encrypted communications through SSL client authentication. Since the public key of the cellular mobile station 2D of Ichiro Tanaka (D) is registered as a member of the Tanaka's family in the group management server 1, the WEP key "tanaka1234567" and the SSID "tanaka_family" of this group are transmitted from the group management server 1 to the cellular mobile station 2D (step S41).

Ichiro Tanaka (D) installs the WEP key and the SSID in the television set 3#1 and the AV server 3#2 from the cellular mobile station 2B by short-range wireless communications. The television set 3#1 and the AV server 3#2 share the WEP key and the SSID, and therefore, encrypted secure communications can be established between the television set 3#1 and the AV server 3#2.

At a later date, Jun Tanaka (F) purchases a game machine 3#3, and adds this device to the home mesh network. Jun Tanaka (F) accesses the group management server 1 using his cellular mobile station 2F through encrypted communications by SSL client authentication. Because the public key of the cellular mobile station 2F of Jun Tanaka (F) is registered as a member of the Tanaka's family, the WEP key "tanaka1234567" and the SSID "tanaka_family" of the Takana's family (the group) are transmitted from the group management server 1 to the cellular mobile station 2F (step S42).

Jun Tanaka (F) installs the WEP key and the SSID in the game machine 3#3 from the cellular mobile station 2F by short-range wireless communication so as to allow the game machine #33 to establish encrypted secure communications with the television set 3#1 and the AV server 3#2 using the WEP key and the SSID commonly used among these devices.

At another later date, Hanako Tanaka (E) purchases a refrigerator with a wireless communication capability, and adds this device to the home network through the similar process.

Figure 8:
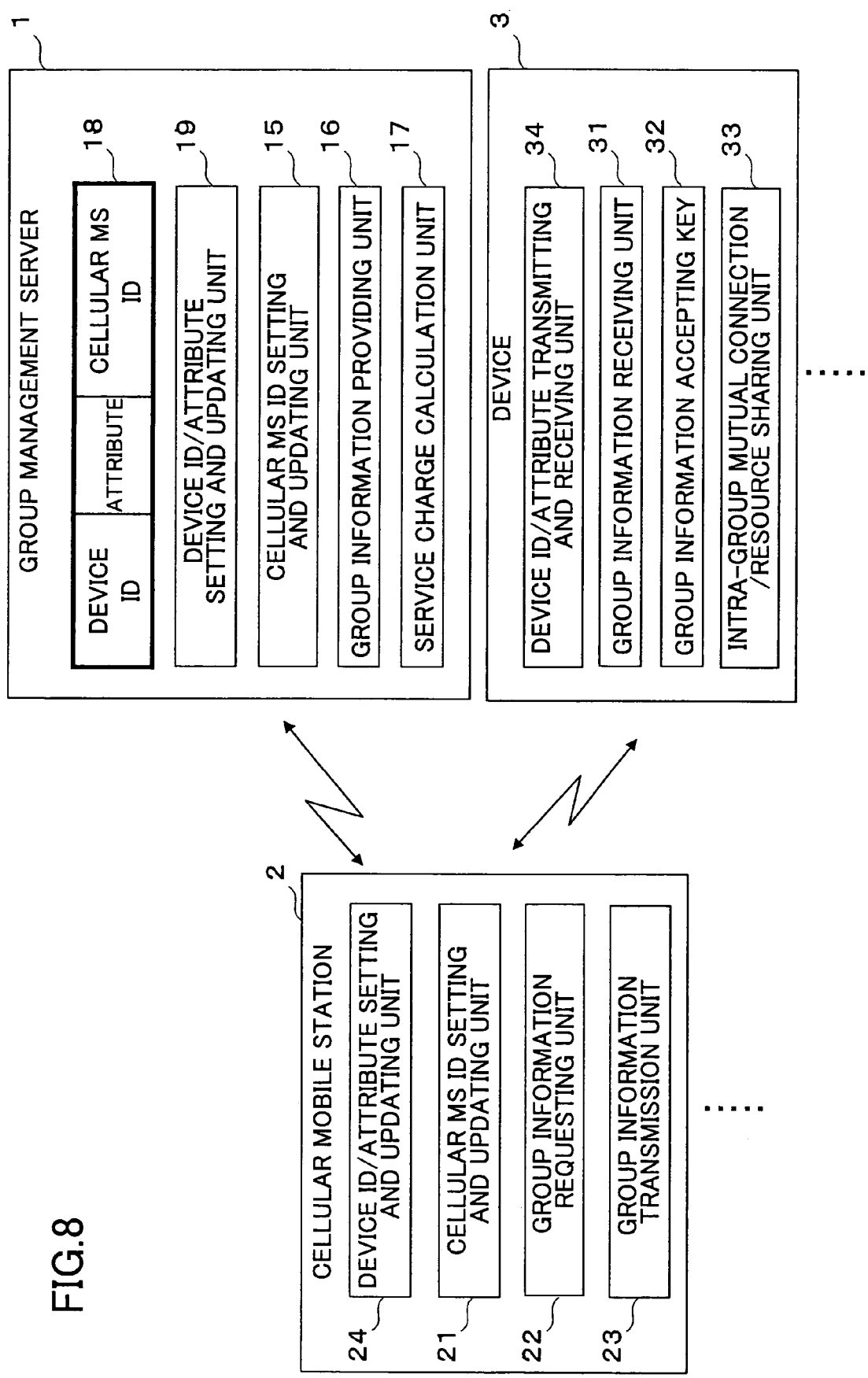
FIG. 8 is a schematic block diagram of a security group management system according to the second embodiment of the invention.

FIG. 8 is a schematic block diagram of the security group management system according to the second embodiment of the invention. In the second embodiment, required QoS is guaranteed between devices.

In FIG. 8, the group management server 1 has a storage unit 18 for storing a device ID and the attribute (typical application, priority level, etc.) in association with the cellular mobile station ID, and a device ID/attribute setting and updating unit 19 for entering and updating device ID information and attribute information in the storage unit 18. The rest of the structure of the group management server 1 is the same as that explained in the first embodiment.

The cellular mobile station 2 has a device ID/attribute setting and updating unit 24, in addition to the cellular MS ID setting and updating unit 21, the group information acquiring unit 22, and the group information transmission unit 23. The device ID/attribute setting and updating unit 24 acquires a device ID and an attribute from device 3, and registers and updated the device ID and the attribute in the group management server 1. Alternatively, the device ID/attribute setting and updating unit 21 may produce a device ID for the device 3, and register the device ID and the attribute of the device 3 in the group management server 1. The device ID/attribute setting and updating unit 24 can also temporarily change the priority level of the device 3 contained in the attribute and communicate the changed priority level to the other devices. The rest of the structure is the same as that explained in the first embodiment.

The device 3 has a device ID/attribute transmitting and receiving unit 34, in addition to the group information receiving unit 31, the group information accepting key 32, and the intra-group mutual connection and resource sharing unit 33. The device ID/attribute transmitting and receiving unit 34 transmits the device ID and the attribute to the cellular mobile station 2 when requested by the cellular mobile station 2, and receives a device ID from the cellular mobile station 2 when it is produced by the cellular mobile station 2. The device ID/attribute transmitting and receiving unit 34 can also receive a temporary attribute changed by the cellular mobile station 2. The rest of the structure is the same as that explained in the first embodiment. If the device 3 has two or more wireless LAN interfaces, it is desired to group the interfaces into an ordinary traffic group and a preferential traffic group so as to prevent frequency overlap when multiple devices 3 are mutually connected or sharing the resources.

Next, explanation is made of an example of a home mesh network established by devices according to the second embodiment, in conjunction with FIG. 9 through FIG. 13.

Figure 9:
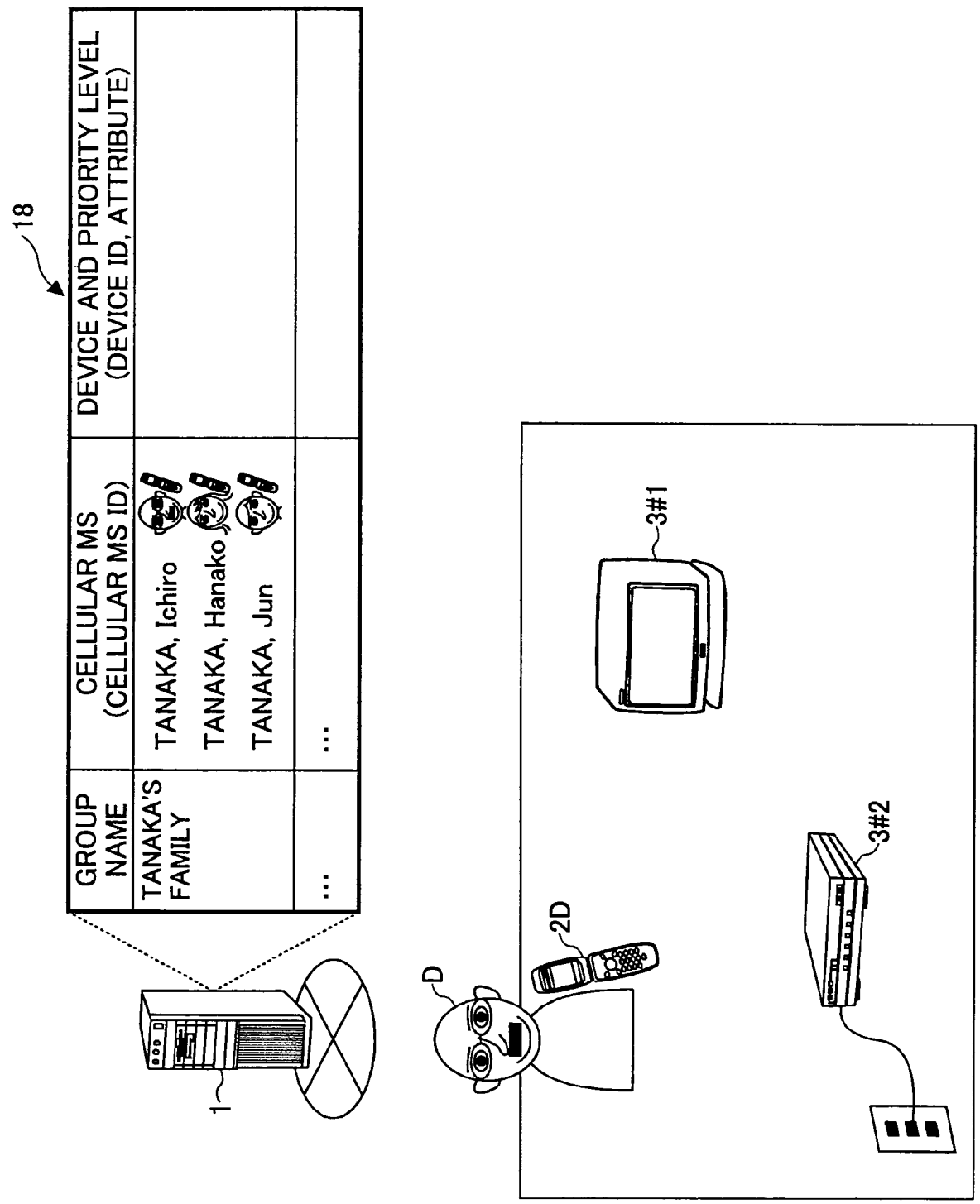
FIG. 9 illustrates an example of registering a cellular mobile station ID in the second embodiment.

In FIG. 9, a group "the Tanaka's family" is registered in the storage unit 18 of the group management server 1. Cellular mobile stations 2D, 2E and 2F owned by Ichiro Tanaka, Hanako Tanaka and Jun Tanaka, respectively, are also stored in association with this group name. These registered cellular mobile stations are authorized to acquires and/or change the group information.

Ichiro Tanaka (D) purchases a television set 3#1 and a home server 3#2 with a gateway (GW) capability for wireless LAN mesh functions, and places these devices in the house to establish a home mesh network.

Figure 10:
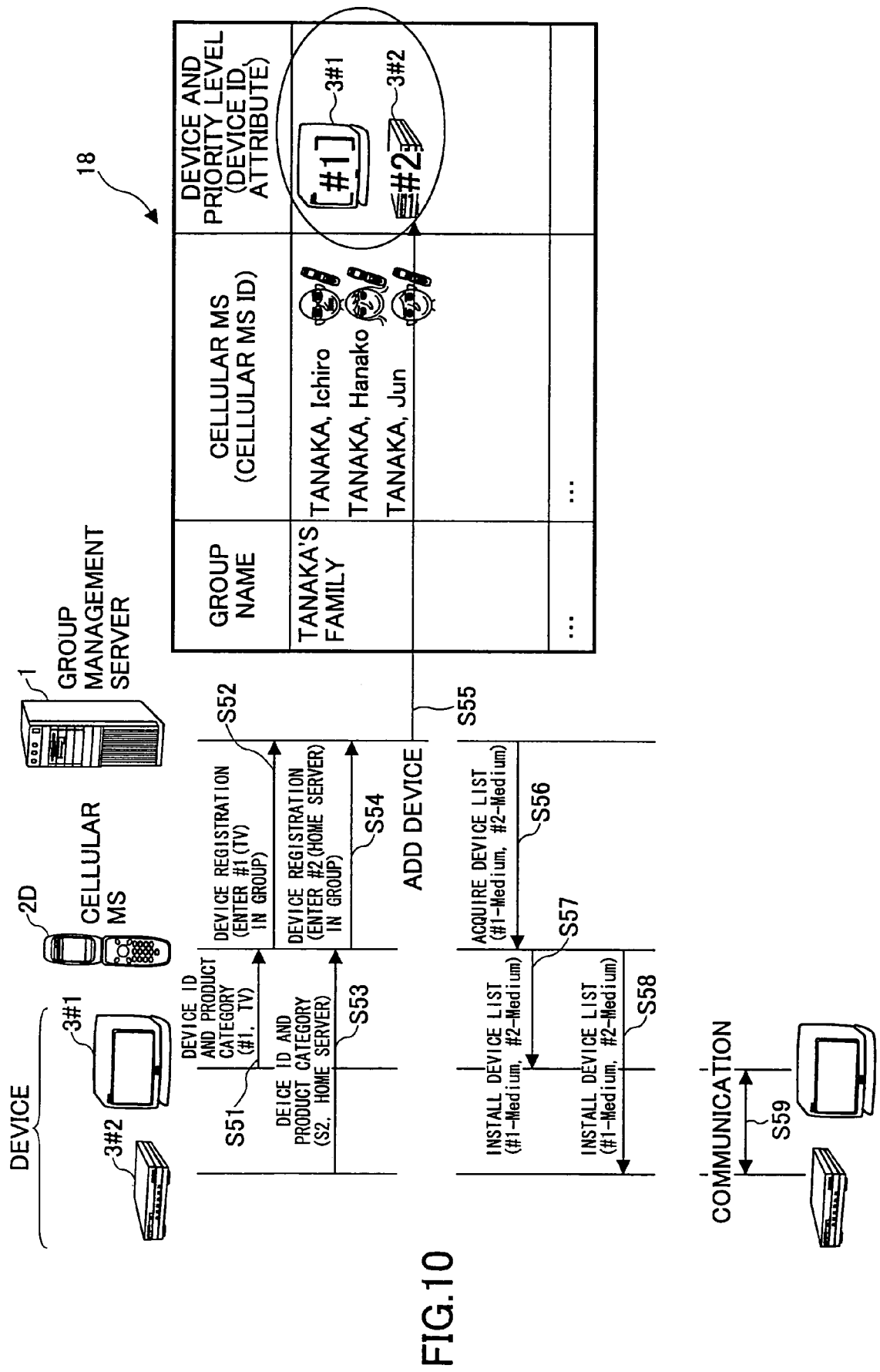
FIG. 10 is a sequence diagram of establishing a home mesh network in the second embodiment.

FIG. 10 is a sequence diagram of establishing the home mesh network. The device IDs and the product categories of the television set 3#1 and 3#2 are registered in the storage unit 18 of the group management server 1 using the cellular mobile station 2D (steps S51-S55). The cellular mobile station 2D receives a device list from the group management server 1 (step S56). The cellular mobile station 2D installs the device list in the television set 3#1 and the home server 3#2 (steps S57 and S58). The television set 3#1 and the home server 3#2 start communications (step S59).

Figure 11:
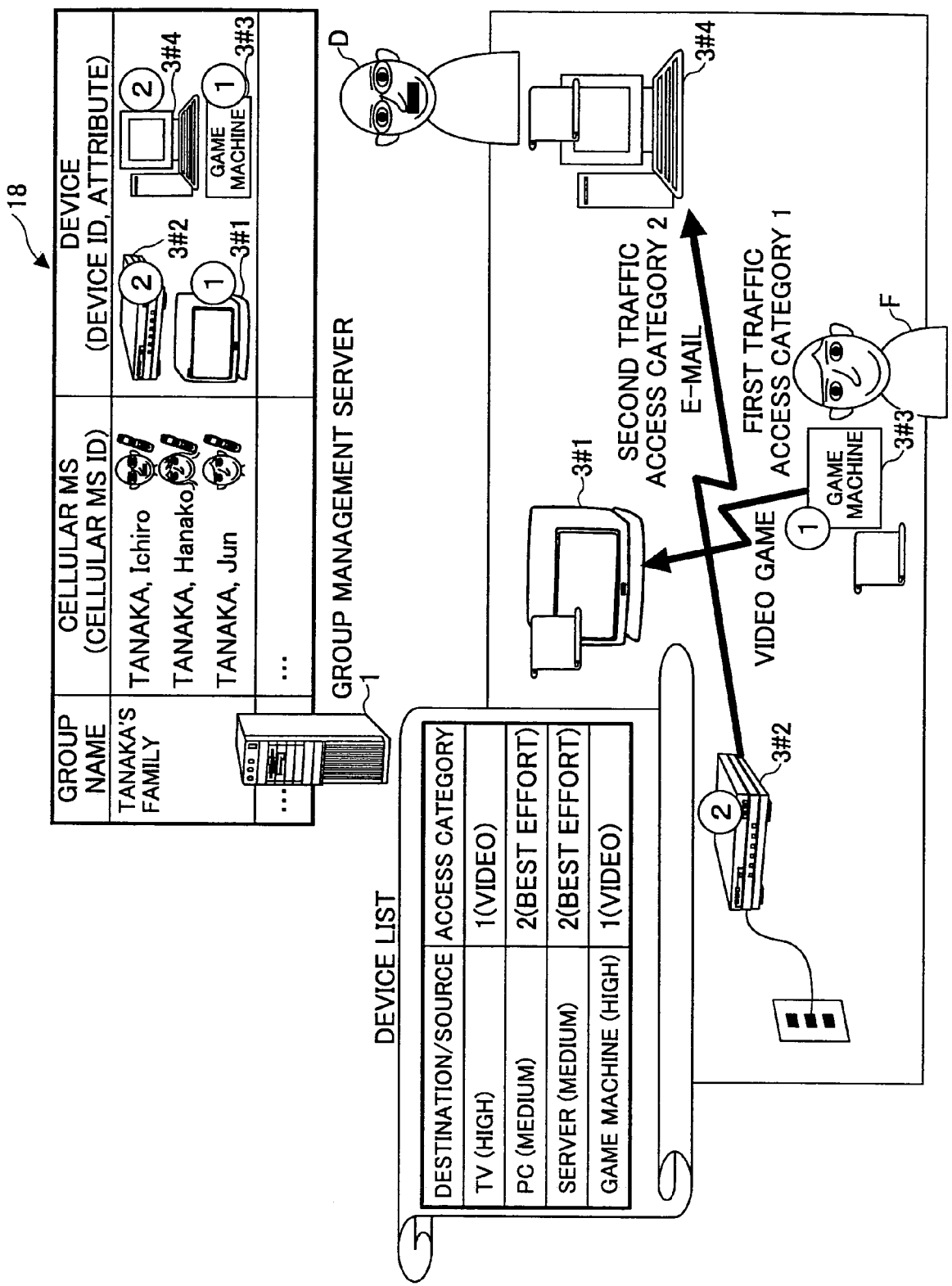
FIG. 11 illustrates an example of setting priority levels for mesh network devices in the group management server and a device list with access category information.

At a later date, Jun Tanaka (F) purchases a game machine 3#3 applicable to a wireless LAN mesh network, and can connect the game machine 3#3 to the television set 3#1, as illustrated in FIG. 11, in a similar manner. Namely, the device ID and the product category of the game machine 3#3 are registered in the group management server 1 using cellular mobile station 2F. The cellular mobile station 2F receives an updated device list from the group management server 1. The device list is installed in the game machine 3#3 from the cellular mobile station 2F via short-range wireless communication.

In addition, Ichiro Tanaka (D) has a personal computer 3#4 applicable to a wireless LAN mesh network in his room, and he checks e-mails saved in the home server 3#2.

In this case, four devices, television set 3#1, home server 3#2, game machine 3#3, and personal computer 3#4, are listed in the device list, as illustrated in FIG. 11. High priority level "1" is given to the game machine 3#3 with a strict requirement for acceptable delay and the television set 3#1 that receives a large amount of video data. The device list in which the priority level is set for each device is distributed to each of the devices via the cellular mobiles stations, and the access categories (priority levels) of the devices are shared by all the home network devices.

If transmission of game data from the game machine and download of e-mail from the home server are carried out simultaneously by Jun Tanaka (F) and Ichiro Tanaka (D), respectively, two traffic streams occur, namely, a) a first traffic stream from game machine 3#3 (source) to television set 3#1 (destination); and b) a second traffic stream from home server 3#2 (source) to personal computer 3#4 (destination).

In the first traffic stream, both the source and the destination have access category "1", and accordingly, packets in this traffic stream are categorized in access category "1". In the second traffic stream, both the source and the destination have access category "2", and accordingly, packets in this traffic are categorized in access category "2". If the access categories of the source device and the destination device do not agree with each other, a higher priority level (with a smaller value) is employed as the access category of that traffic stream.

In the example shown in FIG. 11, the first traffic stream takes precedence over the second traffic stream, and transmission of game data under strict delay requirement can be performed without interference.

Figure 12:
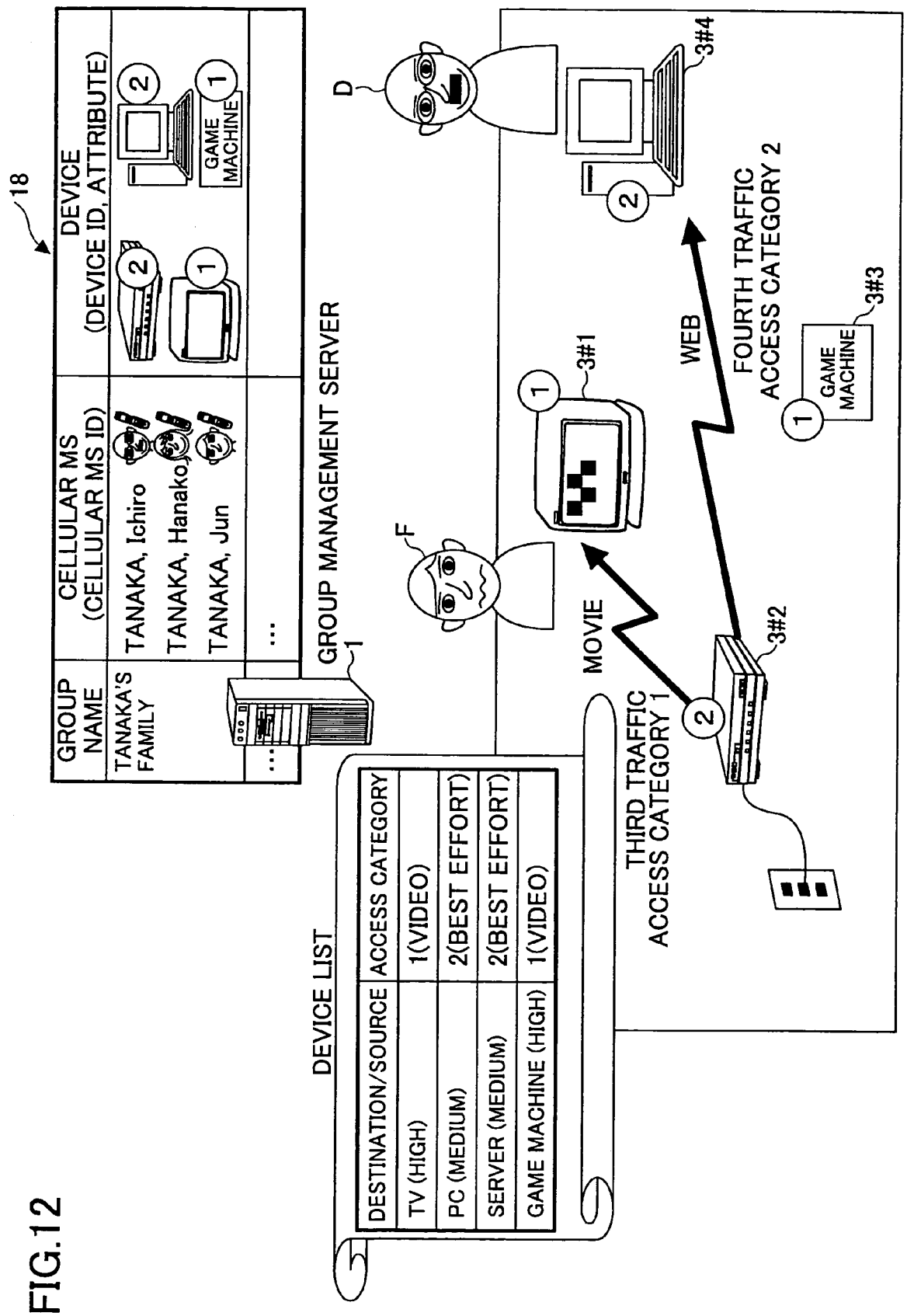
FIG. 12 illustrates another example of setting priority levels for mesh network devices in the group management server and a device list with access category information.

FIG. 12 illustrates another example of network traffic among devices with different priority levels (or preferential levels). Jun Tanaka (F) is watching a movie supplied from the home server 3#2, while Ichiro Tanaka (D) is surfing the net using the personal computer 3#4. The traffic streams occurring in this situation are:

a) a third traffic from home server 3#2 (source) to the television set 3#1 (destination); and b) a fourth traffic from home server 3#2 (source) to the personal computer 3#4 (destination).

In the third traffic stream, access category "2" is given to the source device and access category "1" is given to the destination device. Accordingly, the third traffic stream is categorized in access category "1". In the fourth traffic, access category "2" is given to both the source and destination devices, and this traffic stream is categorized in access category "2".

Since, however, movie delivery requires a huge amount of data transmission, the image quality of the movie cannot be guaranteed with only "1" level difference between the access categories of the two traffic streams. Every time a new Web page is downloaded and displayed on the personal computer 3#2, the picture quality of the movie is degraded, which bothers Jun Tanaka (F).

Figure 13:
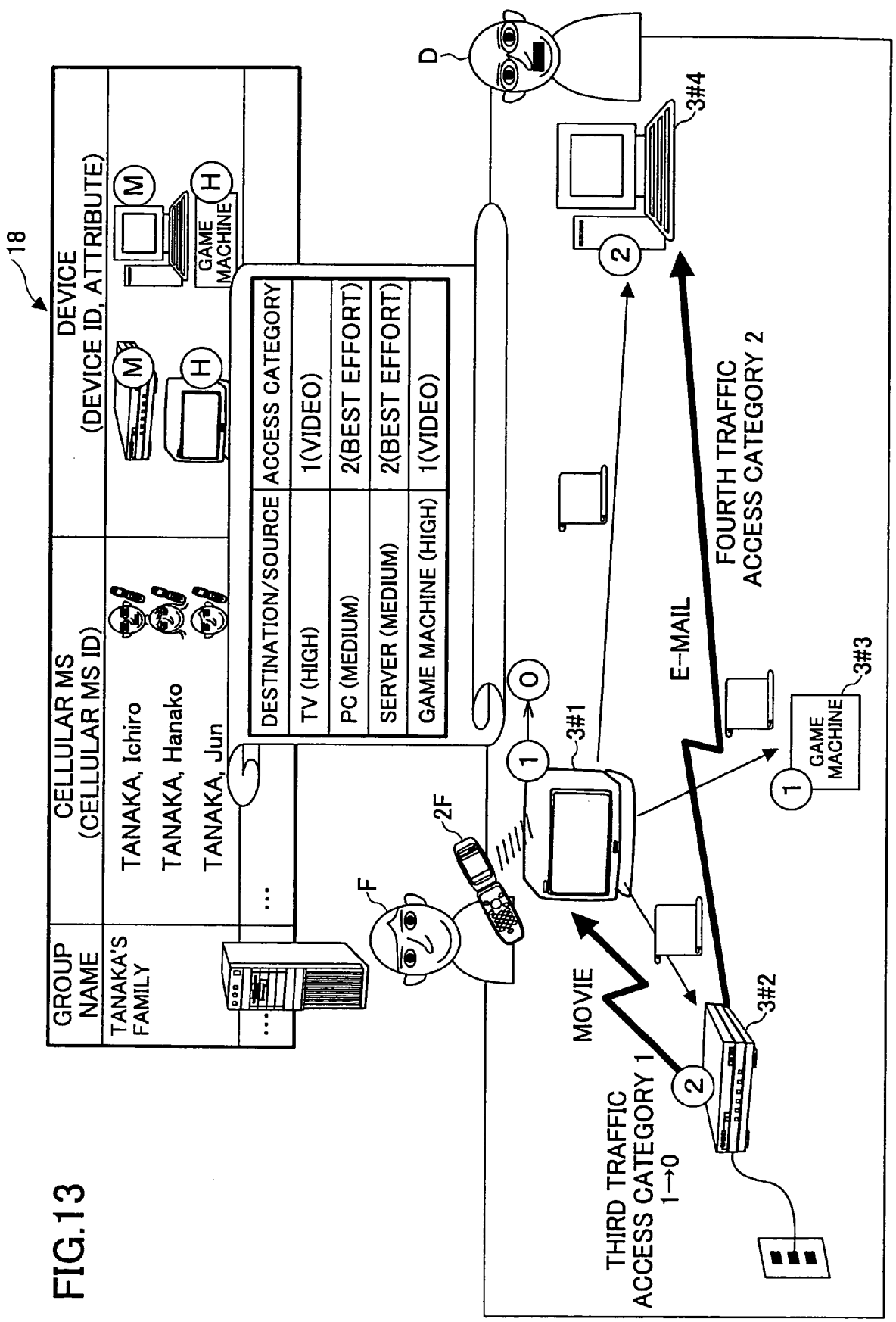
FIG. 13 illustrates still another example of setting priority levels for mesh network devices in the security management server and a device list with access category information.

To avoid this, Jun Tanaka (F) temporarily changes the access category of the television set 3#1 from level "1" to level "0" using the cellular mobile station 2F via short-range wireless communication, as illustrated in FIG. 13. The television set 3#1 transmits a new device list with an updated access category to all the other devices using a wireless LAN beacon signal.

As a result, the access category of the third traffic stream becomes "0" with access category "2" of the source device and access category "1" of the destination device. The access category of the fourth traffic stream does not change and stays at level "2".

Because in FIG. 13 the level difference between the access categories of the third traffic stream and the fourth traffic stream is changed to "2" when the Web traffic is caused by Ichiro Tanaka (D) during the delivery of the movie, video data transmission can be guaranteed with a sufficient level difference between the conflicting traffic streams. Jun Tanaka can enjoy the movie with satisfactory picture quality.

Figure 14:
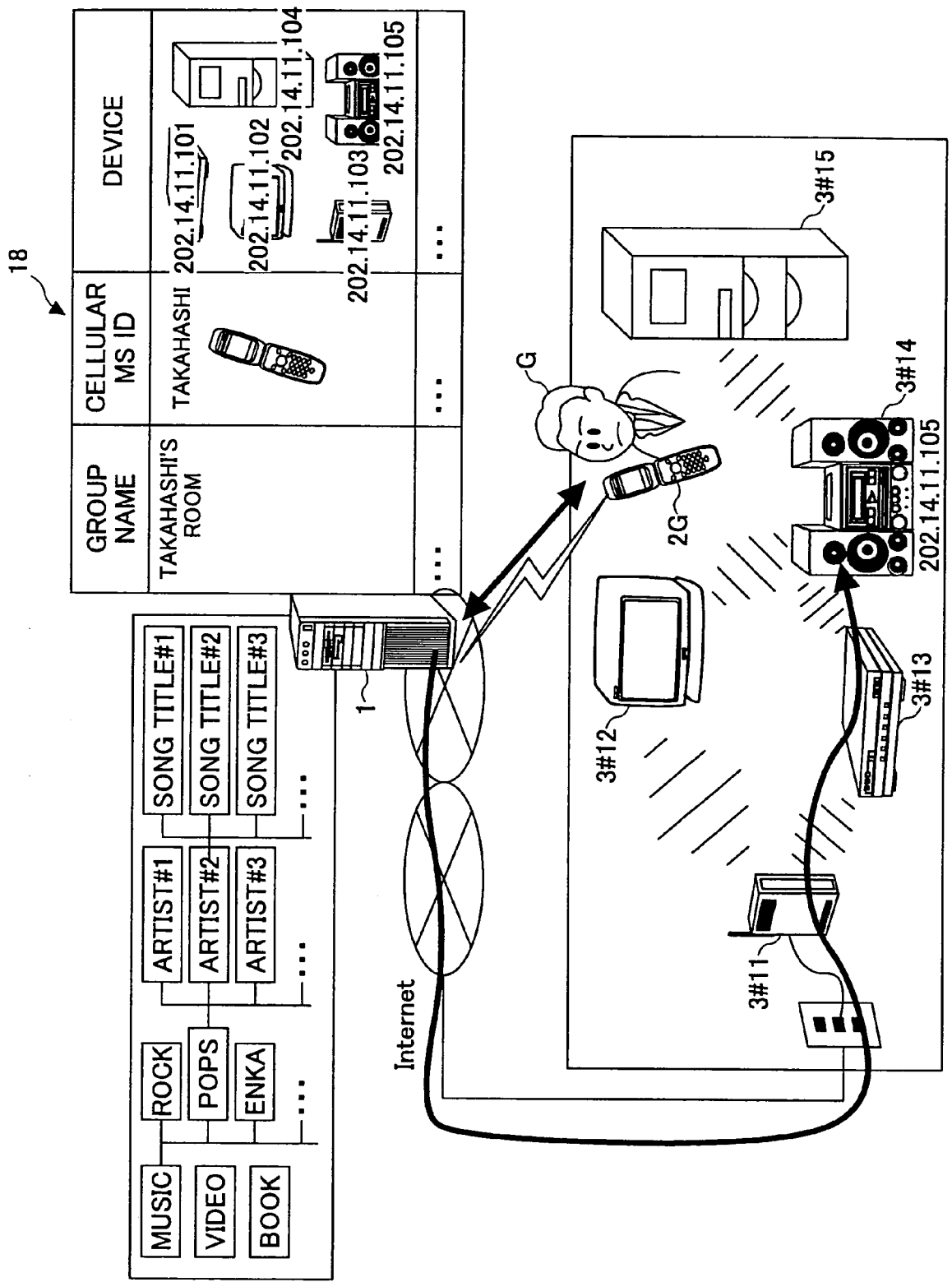
FIG. 14 illustrates an example of delivering contents from the group management server to an appropriate device.

FIG. 14 illustrates an example of delivery of content. In this example, a home network is structured by Mr. Takahashi (G) using a wireless LAN gateway (GW) 3#11, a television set 3#12, a HD recorder 3#13, a sound system with HDD 3#14, and a refrigerator 3#15. The group management server 1 generates and stores a device list in the storage unit 18.

Mr. Takahashi (G) wants to listen to a song title #2 of an artist #2, and requests the group management server 1 to deliver the song using the cellular mobile station 2G. The group management server 1 determines that the requested content is music, and queries the storage unit 18 to select the most appropriate device for reproducing the music from the home network devices. In this example, the group management server 1 selects the sound system 3#14, and delivers the music to the sound system 3#14 via the gateway (GW) 3#11.

In another example, Mr. Takahashi (G) requests the group management server 1 to deliver a cooking recipe. The group management server 1 queries the storage unit 18 to select the most appropriate device to deliver the recipe, and selects the refrigerator 3#15. The content is delivered from the group management server 1 via the gateway (GW) 3#11 to the refrigerator 3#15.

Although the present invention has been described based on the preferred embodiments, the invention is not limited to these examples. There are many modifications and substitutions made by people with an ordinary skill in the art without departing from the scope of the invention, which is defined by the appended claims.

This patent application is based on and claims the benefit of the earlier filing date of Japanese. Patent Application No. 2005-004408 filed Jan. 11, 2005, the entire contents of which are hereby incorporated by reference.

What is claimed is:

1. A security group management system including a cellular mobile station, two or more devices belonging to a group, and a group management server, wherein the group management server comprises:

a storage unit configured to store information about the cellular mobile station and group information about the group in advance; and a group information providing unit configured to supply the group information in response only to an access from the registered cellular mobile station; and wherein the cellular mobile station has a group information transmission unit configured to supply the group information to the devices so as to allow the devices to recognize that the devices belong to the group and to perform secure mutual connection and/or resource sharing among the devices, wherein the group information includes a wired equivalent privacy (WEP) key, which is a symmetric key used in the group, and a service set identifier (SSID) for the group.

2. The security group management system of claim 1, wherein the group information is an electronic certificate containing a first public key allocated to the group and signed by a first private key paired with the first public key.

3. The security group management system of claim 2, wherein when one of the devices has received the electronic certificate, the device thereafter relies on a publisher of the electronic certificate as a certificate authority.

4. The security group management system of claim 2, wherein the group information is a device key pair consisting of a second private key and a second public key allocated for each of the devices.

5. The security group management system of claim 1, wherein the group information is a symmetric key allocated to the group.

6. The security group management system of claim 1, wherein the group information is a device list listing the devices belonging to the group.

7. The security group management system of claim 1, wherein communication between the cellular mobile station and the group management server is started after SSL client authentication is successful.

8. The security group management system of claim 1, wherein the cellular mobile station and the devices have short-range wireless interfaces, and the group information is supplied from the cellular mobile station to the devices via short-range wireless communications.

9. The security group management system of claim 1, wherein at least one of the devices has a hardware button for limiting receipt of the group information to a prescribed period of time after the hardware button is depressed.

10. The security group management system of claim 1, wherein the storage unit includes:
   a first storage unit configured to store a group identification in association with the group information;
   a second storage unit configured to store an individual identification representing an individual belonging to the group and using the cellular mobile station, in association with the group ID; and
   a third storage unit configured to store a cellular mobile station identification representing the cellular mobile station in association with the individual identification.

11. The security group management system of claim 10, wherein the cellular mobile station identification is registered and updated in the third storage unit in response to a request from the cellular mobile station.

12. The security group management system of claim 1, wherein the group management server produces and outputs a two-dimensional code containing an individual ID representing a user of the cellular mobile station and a network address of the group management server, and the cellular mobile station has a code reader for reading the two-dimensional code distributed to the user to access the group management server.

13. The security group management system of claim 1, wherein the storage unit further stores device identification for specifying each of the devices and
   an attribute of the associated one of the devices, in association with a cellular mobile station identification specifying the cellular mobile station.

14. The security group management system of claim 13, wherein the device identification is acquired by the cellular mobile station from the device, and supplied from the cellular mobile station to the group management server.

15. The security group management system of claim 13, wherein the device identification is produced by a user of the cellular mobile station, given to the device, and registered and updated in the storage unit of the group management server.

16. The security group management system of claim 13, wherein the storage unit stores a typical application of each of the devices as the attribute, in association with a traffic priority level for the device.

17. The security group management system of claim 16, wherein the storage unit temporarily changes the traffic priority level in response to a request from the cellular mobile station, and the group information providing unit informs the devices of the change via the cellular mobile station.

18. The security group management system of claim 16, wherein at least one of the devices has two or more wireless interfaces, and the wireless interfaces are grouped into an ordinary traffic group and a preferential traffic group so as to prevent frequencies from overlapping each other.

19. The security group management system of claim 16, wherein upon receiving a request for content delivery from the cellular mobile station, the group management server selects a most appropriate device to receive the content from the storage unit and deliver the content to the selected device.

20. The security group management system of claim 1, wherein the group management server further comprises:
   a service charge calculation unit configured to calculate a service charge based upon at least one of a storage area utilization size, service utilization time, access counts, accessing time, and an acquired information amount.

21. A security group management method applied to a mesh network including a cellular mobile station, two or more devices belonging to a group, and a group management server, the method comprising the steps of:
   registering the cellular mobile station in the group management server in advance;
   generating and storing group information for the group in the group management server;
   supplying the group information from the group management server to the cellular mobile station in response only to an access from the registered cellular mobile station, and
   supplying the group information from the cellular mobile station to the devices so as to allow the devices to recognize that the devices belong to the group and to perform secure mutual connection and/or resource sharing among the devices, wherein the group information includes a wired equivalent privacy (WEP) key, which is a symmetric key used in the group, and a service set identifier (SSID) for the group.

* * * * *